US010353627B2

(12) United States Patent
Hong et al.

(10) Patent No.: US 10,353,627 B2
(45) Date of Patent: Jul. 16, 2019

(54) MEMORY DEVICE AND MEMORY SYSTEM HAVING THE SAME

(71) Applicant: SK hynix Inc., Gyeonggi-do (KR)

(72) Inventors: Yong Hwan Hong, Gyeonggi-do (KR); Byung Ryul Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 46 days.

(21) Appl. No.: 15/582,175

(22) Filed: Apr. 28, 2017

(65) Prior Publication Data
US 2018/0067693 A1 Mar. 8, 2018

(30) Foreign Application Priority Data

Sep. 7, 2016 (KR) .................. 10-2016-0115128

(51) Int. Cl.
*G06F 3/06* (2006.01)

(52) U.S. Cl.
CPC ............ *G06F 3/0656* (2013.01); *G06F 3/061* (2013.01); *G06F 3/0632* (2013.01); *G06F 3/0673* (2013.01); *G06F 3/0679* (2013.01); *G06F 3/0688* (2013.01)

(58) Field of Classification Search
CPC ............... G06F 3/00; G06F 3/06–061; G06F 3/0611–0632; G06F 3/0634–0656; G06F 3/0658–0673; G06F 3/0674–0689; G06F 5/00–16; G06F 9/00–548; G06F 11/00–3696; G06F 12/00–16; G06F 13/00–4295; G06F 17/00–5095; G06F 2003/0691–0698; G06F 2009/3883;
(Continued)

(56) References Cited

U.S. PATENT DOCUMENTS 5,860,083 A * 1/1999 Sukegawa ............ G06F 12/08
711/103
5,995,462 A * 11/1999 Harold-Barry ...... G11B 7/0946
369/53.18
(Continued)

FOREIGN PATENT DOCUMENTS

KR            101067457         9/2011
KR         1020140134797        11/2014

OTHER PUBLICATIONS

Content Look-Aside Buffer for Redundancy-Free Virtual Disk I/O and Caching; Yang et al.; Proceedings of the 13th ACM SIGPLAN/SIGOPS International Conference on Virtual Execution Environments, pp. 214-227; Apr. 8-9, 2017 (Year: 2017).*

(Continued)

*Primary Examiner* — Daniel C. Chappell
(74) *Attorney, Agent, or Firm* — IP & T Group LLP (57) ABSTRACT

The invention relates to a memory device and a memory system having the same. The memory device includes a memory block including a plurality of pages, a peripheral circuit including a plurality of buffers sensing data stored in a selected page of the plurality of pages, temporarily storing high usage frequency data, and outputting the data, and a control circuit controlling the peripheral circuit to output the data after performing a sensing operation on the selected page, storing the high usage frequency data to at least one of the buffers, or outputting the high usage frequency data without performing the sensing operation in response to a read command.

12 Claims, 10 Drawing Sheets

(58) Field of Classification Search
CPC ............... G06F 2009/45562–45595; G06F 2212/00–7211
See application file for complete search history.

(56) References Cited

U.S. PATENT DOCUMENTS

| | | | | |
|---|---|---|---|---|
| 6,256,707 | B1* | 7/2001 | Ooishi | G06F 12/0804 711/118 |
| 6,408,345 | B1* | 6/2002 | Fuoco | G06F 12/0851 710/22 |
| 6,728,806 | B2* | 4/2004 | Kakiage | G06F 3/0613 710/65 |
| 7,187,584 | B2* | 3/2007 | Chang | G11C 8/12 365/185.12 |
| 7,861,032 | B2* | 12/2010 | Song | G06F 3/0613 711/112 |
| 8,051,300 | B2* | 11/2011 | Cherian | G06F 3/0605 380/277 |
| 8,117,396 | B1* | 2/2012 | Fair | G06F 12/0866 709/201 |
| 8,145,828 | B2* | 3/2012 | Ouchi | G06F 1/3225 711/103 |
| 9,069,484 | B2* | 6/2015 | Zhang | G06F 12/121 |
| 9,317,375 | B1* | 4/2016 | Sadhu | G06F 11/1451 |
| 9,772,803 | B2* | 9/2017 | Jung | G06F 3/0688 |
| 9,880,744 | B1* | 1/2018 | Dalal | G06F 3/061 |
| 9,916,105 | B1* | 3/2018 | Asnaashari | G06F 3/0604 |
| 9,971,681 | B2* | 5/2018 | Zhang | G06F 12/0246 |
| 10,019,176 | B2* | 7/2018 | Yoon | G06F 3/0619 |
| 10,209,900 | B2* | 2/2019 | Goel | G06F 3/0613 |
| 2004/0030971 | A1* | 2/2004 | Tanaka | G06F 11/1008 714/718 |
| 2004/0123033 | A1* | 6/2004 | Rudelic | G06F 12/0893 711/118 |
| 2004/0148482 | A1* | 7/2004 | Grundy | G06F 12/06 711/167 |
| 2004/0174741 | A1* | 9/2004 | Tanaka | G11C 11/5621 365/185.08 |
| 2005/0138232 | A1* | 6/2005 | Tamura | G06F 12/0808 710/22 |
| 2007/0019468 | A1* | 1/2007 | Seong | G11C 11/5628 365/185.03 |
| 2007/0070694 | A1* | 3/2007 | Yamagami | G06F 3/0601 365/185.08 |
| 2008/0235442 | A1* | 9/2008 | Chae | G06F 12/0893 711/103 |
| 2009/0031080 | A1* | 1/2009 | Kim | G11C 16/10 711/114 |
| 2009/0185420 | A1* | 7/2009 | Seong | G11C 11/5628 365/185.03 |
| 2010/0082889 | A1* | 4/2010 | Terasaki | G06F 12/0246 711/103 |
| 2010/0088466 | A1* | 4/2010 | Nakanishi | G06F 3/0613 711/103 |
| 2011/0022781 | A1* | 1/2011 | Wakrat | G06F 12/0246 711/103 |
| 2011/0185126 | A1* | 7/2011 | Sasaki | G06F 12/0837 711/124 |
| 2012/0054421 | A1* | 3/2012 | Hiratsuka | G06F 12/0246 711/103 |
| 2013/0117497 | A1* | 5/2013 | Cui | G06F 12/121 711/103 |
| 2013/0163335 | A1* | 6/2013 | Kim | G11C 16/0483 365/185.12 |
| 2014/0095792 | A1* | 4/2014 | Hataida | G06F 12/0893 711/122 |
| 2015/0324134 | A1* | 11/2015 | Sendelbach | G06F 12/0868 710/310 |
| 2016/0034352 | A1* | 2/2016 | Michael | G06F 11/1072 714/773 |
| 2017/0090755 | A1* | 3/2017 | Sun | G06F 3/061 |
| 2017/0371807 | A1* | 12/2017 | Chai | G06F 12/0891 |

OTHER PUBLICATIONS

BAGC: Buffer-Aware Garbage Collection for Flash-Based Storage Systems; Lee et al.; IEEE Transactions on Computers, vol. 62, iss. 11, pp. 2141-2154; Nov. 2013 (Year: 2013).*
Performance Trade-Offs in Using NVRAM Write Buffer for Flash Memory-Based Storage Devices; Kang et al.; IEEE Transactions on Computers, vol. 58, iss. 6, pp. 744-758; Jun. 2009 (Year: 2009).*
Recently-evicted-first buffer replacement policy for flash storage devices; Seo et al.; IEEE Transactions on Consumer Electronics, vol. 54, iss. 3, pp. 1228-1235; Aug. 2008 (Year: 2008).*

* cited by examiner

MEMORY DEVICE AND MEMORY SYSTEM HAVING THE SAME

CROSS-REFERENCE TO RELATED APPLICATION

The present application claims priority under 35 U.S.C. § 119(a) to Korean patent application number 10-2016-0115128, filed on Sep. 7, 2016, the entire disclosure of which is incorporated herein by reference in its entirety.

BACKGROUND

Field of Invention

Various embodiments of the invention relate generally to a semiconductor designing technology, and more particularly, to a memory device for managing high usage frequency data and a memory system having the same.

Description of Related Art

Memory systems are being widely used as data storages of digital devices, such as computers, digital cameras, MP3 players, and smartphones. A memory system may include a memory device configured to store data and a memory controller configured to control the memory device. When a digital device is a host, the memory controller of the memory system may transfer various kinds of information including commands and data between the host and the memory device.

Recently, with the improvement of the portability of digital devices, data usage has also been gradually increasing. In response to such data increase, a memory system may include a plurality of memory devices. The memory devices may communicate with a memory controller through a channel. For example, a plurality of memory devices may be coupled to a single channel, and the memory system may include a plurality of channels.

SUMMARY

Various embodiments are directed to a memory device capable of reducing a read operation time and the workload of a memory controller, and a memory system including the same.

According to an embodiment, a memory device may include a memory block including a plurality of pages, a peripheral circuit including a plurality of buffers sensing data stored in a selected page of the plurality of pages, temporarily storing high usage frequency data, and outputting the data, and a control circuit controlling the peripheral circuit to output the data after performing a sensing operation on the selected page, storing the high usage frequency data to at least one of the buffers, or outputting the high usage frequency data without performing the sensing operation in response to a read command.

According to an embodiment, a memory system may include a memory controller generating a normal read command, a backup read command or a restore read command, and a memory device including a memory block storing data, wherein the memory device senses the data to output the sensed data in response to the normal read command; senses high usage frequency data from the sensed data, stores the high usage frequency data in a temporary buffer, and outputs the high usage frequency data in response to the backup read command; or outputs the high usage frequency data stored in the temporary buffer in response to the restore read command.

DETAILED DESCRIPTION

Hereinafter, various exemplary embodiments will be described in detail with reference to the accompanying drawings. In the drawings, thicknesses and lengths of components may be exaggerated for convenience of illustration. In the following description, a detailed description of related functions and constitutions may be omitted for simplicity and conciseness. Like reference numerals refer to like elements throughout the specification and drawings.

It is also noted that in this specification, "connected/coupled" refers to one component not only directly coupling another component but also indirectly coupling another component through an intermediate component. In addition, throughout the specification, when it is said that a certain part "includes" a certain element, this does not exclude other elements from being included but the certain part may further include another element unless particularly described otherwise.

Figure 1:
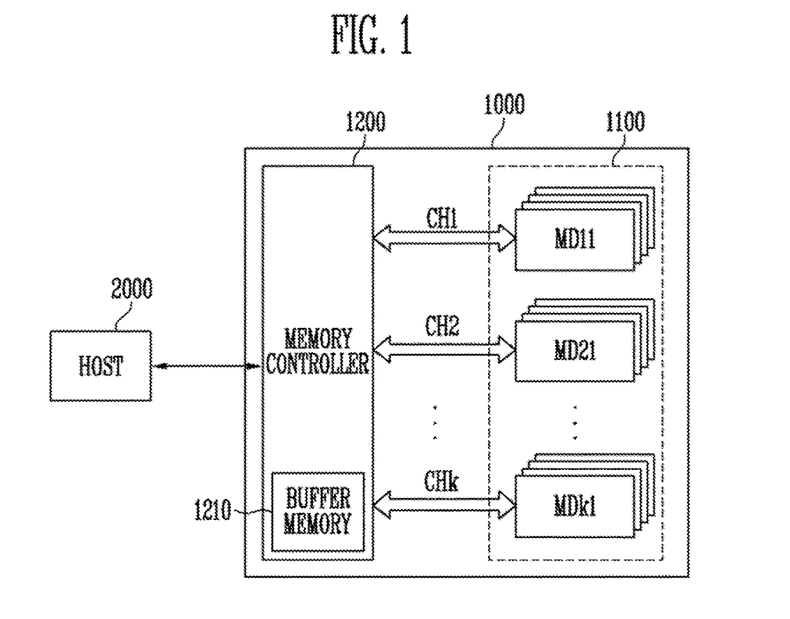
FIG. 1 is a block diagram illustrating a memory system according to an embodiment of the present invention.

FIG. 1 is a block diagram illustrating a memory system 1000 according to an embodiment of the present invention.

Referring to FIG. 1, the memory system 1000 may include a memory group 1100 storing data and a memory controller 1200 controlling the memory group 1100.

The memory group 1100 may include a plurality of memory devices MD11 to MDk1, where k is a positive integer. The memory devices MD11 to MDk1 may communicate with the memory controller 1200 through channels CH1, CH2, . . . , and CHk, respectively.

When the memory controller 1200 receives a command from the host 2000, the memory controller 1200 may control the memory devices MD11 to MDk1 through the channels CH1, CH2, . . . , and CHk in response to the received command. For example, the memory controller 1200 may select one of the memory devices MD11 to MDk1, and control the selected memory device in response to the command.

The memory controller 1200 may include a buffer memory 1210. The buffer memory 1210 may store various types of data necessary to perform operations on the memory system 1000. However, according to an embodiment, high usage frequency data may be stored in the memory devices MD11 to MDk1, instead of the buffer memory 1210.

Figure 2:
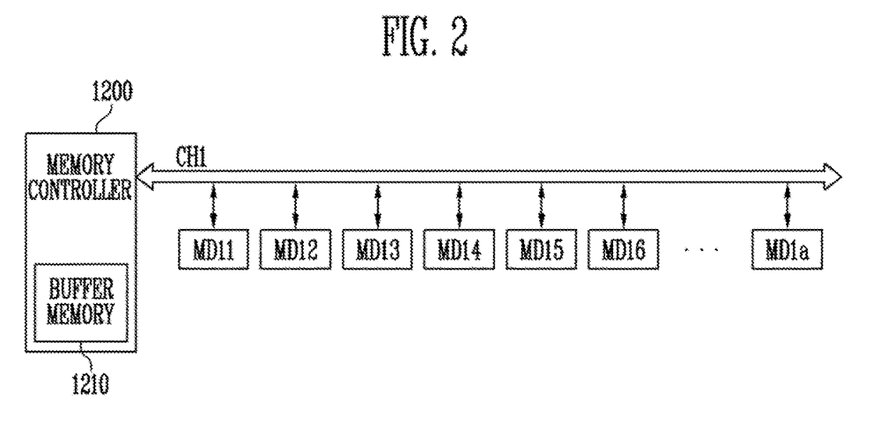
FIG. 2 is a block diagram illustrating a connection between a memory controller and memory devices shown in FIG. 1.

FIG. 2 is a block diagram illustrating a connection between the memory controller 1200 and the memory devices MD11 to MDk1 shown in FIG. 1.

FIG. 2 illustrates memory devices MD11 to MD1a coupled to a first channel CH1, among the memory devices MD11 to MDk1 shown in FIG. 1, where a is a positive integer. However, the memory devices MD21 to MDk1 as shown in FIG. 1 may also be coupled to the memory controller 1200 through the respective channels CH2 to CHk in the same manner as the memory devices MD11 to MD1a shown in FIG. 2.

The memory devices MD11 to MD1a may be volatile memory devices or non-volatile memory devices. However, since non-volatile memory devices that can maintain data even in the absence of power supply are widely available as portable electronic devices, the non-volatile memory devices will be described as an embodiment. For example, NAND flash memory devices will be described below.

Since the memory devices MD11 to MD1a may have similar structures to each other, one of the memory devices MD11 to MD1a, for example, the memory device MD11, will be described in detail.

Figure 3:
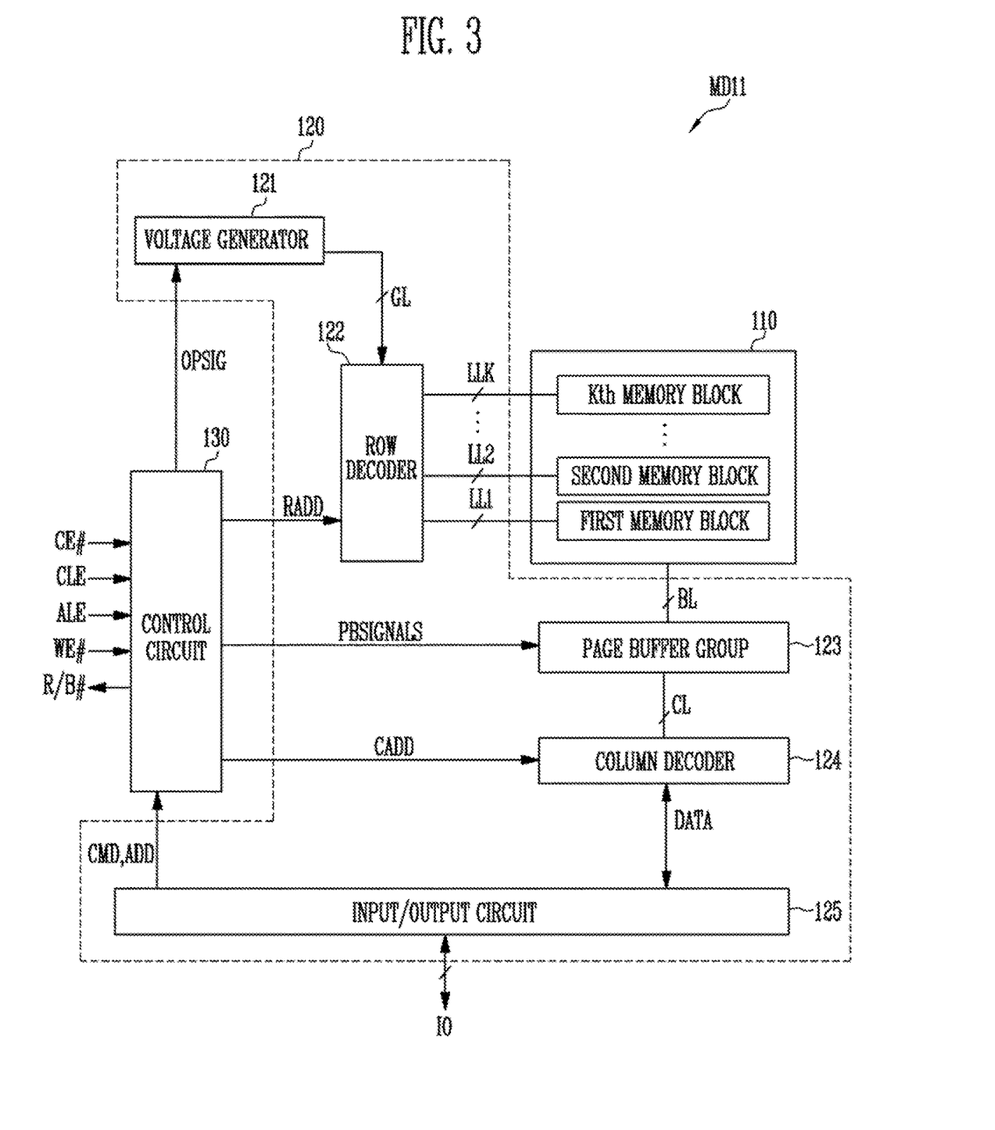
FIG. 3 is a detailed block diagram of the memory device shown in FIG. 1.

FIG. 3 is a detailed block diagram of the memory device MD11 shown in FIG. 1.

Referring to FIG. 3, the memory device MD11 may include a memory cell array 110 storing data, a peripheral circuit 120 configured to perform a program operation, a read operation or an erase operation on the memory cell array 110, and a control circuit 130 configured to control the peripheral circuit 120.

The memory cell array 110 may include first to Kth memory blocks having the same configuration, where K is a positive integer. The first to Kth memory blocks may have a two-dimensional or three-dimensional structure. The two-dimensional structure may refer to the structure in which memory cells are arranged in a horizontal direction relative to a semiconductor substrate (not shown). The three-dimensional structure may refer to the structure in which memory cells are arranged in a vertical direction relative to a semiconductor substrate.

The peripheral circuit 120 may include a voltage generator 121, a row decoder 122, a page buffer group 123, a column decoder 124 and an input/output circuit 125.

The voltage generator 121 may generate operating voltages having various levels in response to an operation signal OPSIG. For example, during a read operation, the voltage generator 121 may generate operating voltages having various levels, for examples, a read voltage and a pass voltage necessary to perform the read operation, when receiving the operation signal OPSIG denoting the read operation. These operating voltages may be transferred to the row decoder 122 through global lines GL.

The row decoder 122 may select at least one of the first to Kth memory blocks in response to a row address RADD and transfer the operating voltages from the global lines GL to the selected memory block or local lines LL1 to LLK coupled to the memory blocks.

The page buffer group 123 may be coupled to the memory cell array 110 through bit lines BL, sense data through the bit lines BL in response to a page buffer control signal PBSIGNALS, and temporarily store the sensed data. The page buffer group 123 may temporarily store data with high usage frequency, hereinafter, referred to as "high usage frequency data", from the memory device MD11 and immediately output the corresponding data in response to a request for outputting the high usage frequency data. For example, the page buffer group 123 may output the temporarily stored data through column lines CL.

The column decoder 124 may transfer data DATA between the page buffer group 123 and the input/output circuit 125 in response to a column address CADD.

The input/output circuit 125 may be coupled to the memory controller 1200 through input/output lines IO. The input/output circuit 125 may receive a command CMD and an address ADD from the memory controller 1200 through the input/output lines IO, or exchange the data DATA with the memory controller 1200. For example, the input/output circuit 125 may transfer the received command CMD and address ADD to the control circuit 130 and the received data DATA to the column decoder 124. In addition, the input/output circuit 125 may output the data received from the column decoder 124 to the memory controller 1200 through the input/output lines IO. For reference, the input/output circuit 125 of the memory device MD11 may be coupled to the memory controller 1200 through the input/output lines IO and the first channel CH1.

The control circuit 130 may recognize that the memory device MD11 is selected in response to a chip enable signal CE# and may be ready to receive various signals or data. The control circuit 130 may be ready to receive the command CMD in response to a command latch enable signal CLE and the address ADD in response to an address latch enable signal ALE. The control circuit 130 may receive the command CMD or the address ADD in response to toggle of a write enable signal WE#. The control circuit 130 may output a ready/busy signal R/B# indicating whether it is in a ready state or a busy state in response to an operating state of the memory device MD11.

According to an embodiment, a read operation may include a normal read operation, a backup read operation and a restore read operation, each of which may be performed in response to the command CMD. That is, each operation may be performed in response to the command CMD input to the memory device MD11. For example, the control circuit 130 may control the peripheral circuit 120 to perform a normal read operation when receiving a normal read command, perform a backup read operation when receiving a backup read command, and perform a restore read operation when receiving a restore read command.

The recent memory blocks may include three-dimensionally structured strings, which are described below.

Figure 4:
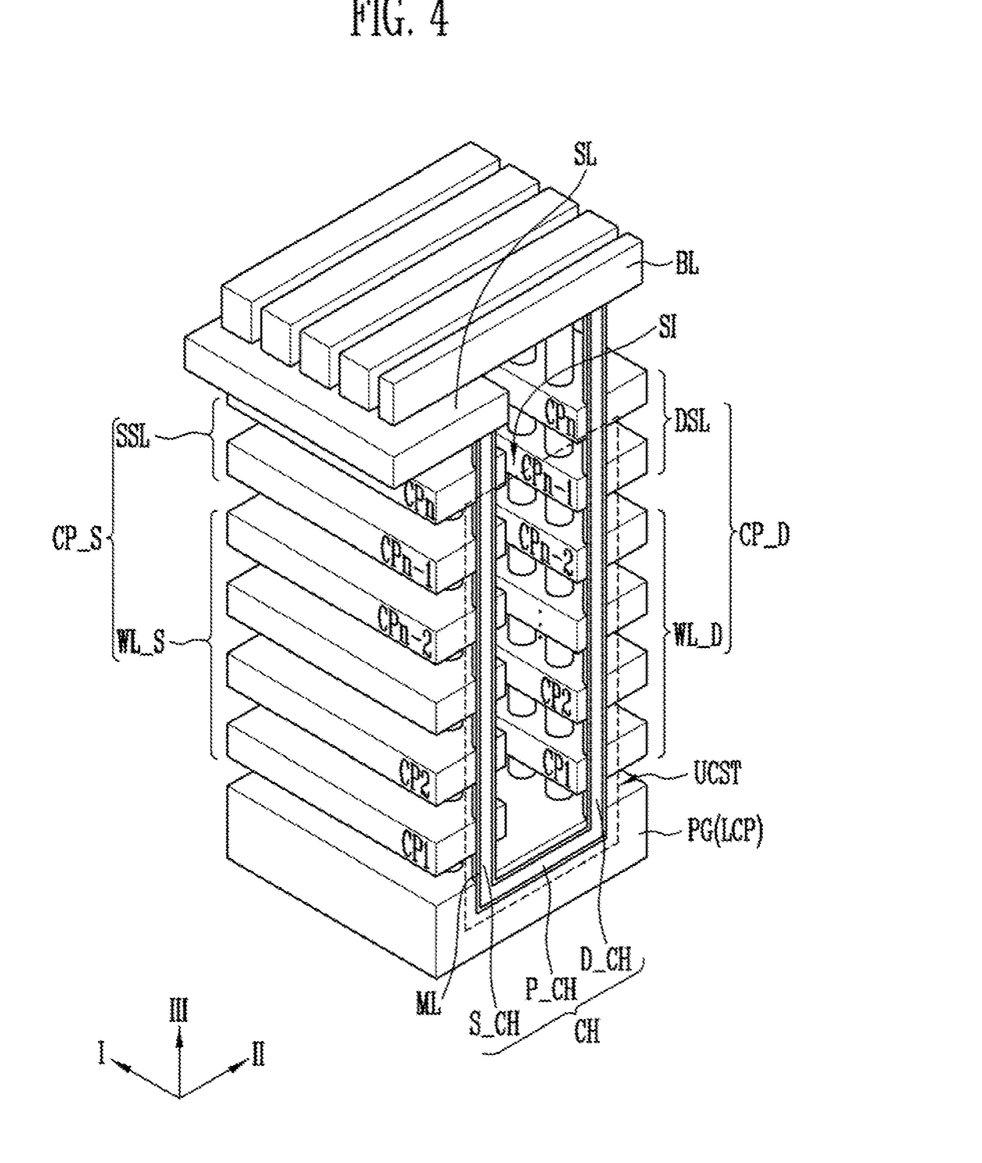
FIGS. 4 and 5 are perspective views illustrating various strings according to embodiments of the present invention.
Figure 5:
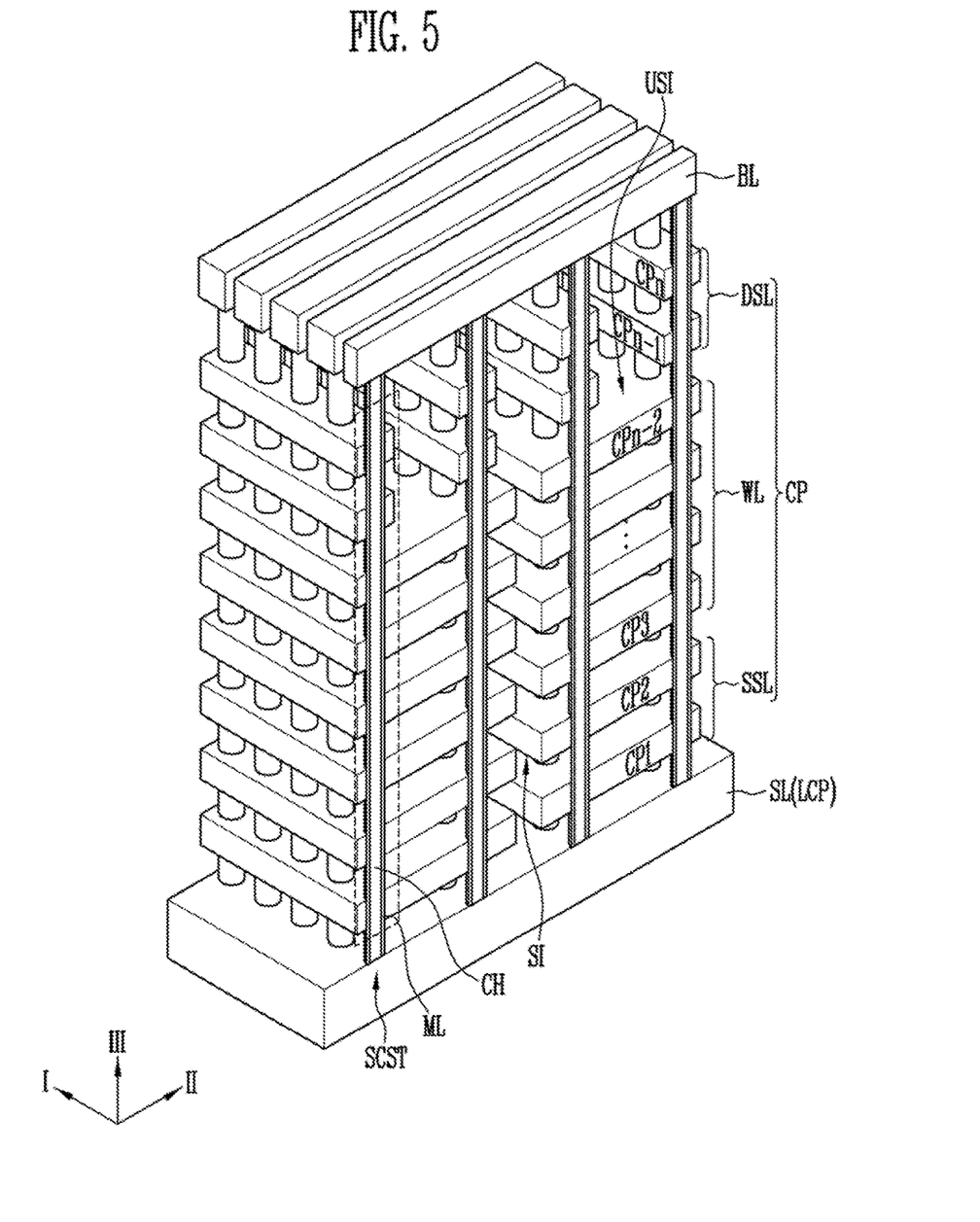

FIGS. 4 and 5 are perspective views illustrating various strings according to embodiments of the present invention.

Referring to FIG. 4, a U type string UCST may include memory cells and selection transistors arranged along a U type channel layer CH. Gates of the memory cells and gates of the selection transistors may be coupled to string conductive patterns CP1 to CPn.

The channel layer CH may include a pipe channel layer P_CH buried in a pipe gate PG, and a source side channel layer S_CH and a drain-side channel layer D_CH extending from the pipe channel layer P_CH. The channel layer CH may have a tubular shape surrounding a core insulating layer filling a central area of a U-shaped hole, or the channel layer CH may completely fill the central area of the U-shaped hole.

The channel layer CH may be electrically coupled between a source line SL and the bit line BL. The bit line BL and the source line SL may be arranged on different layers and separated from each other. For example, the source line SL may be arranged below the bit line BL. The source line SL may be electrically coupled to a top portion of the source side channel layer S_CH. The source line SL may extend in a I direction. A source contact plug may be formed between the source line SL and the source side channel layer S_CH. The bit line BL may be electrically coupled to a top portion of the drain-side channel layer D_CH. The bit line BL may extend in a II direction crossing the I direction. A drain contact plug may be formed between the bit line BL and the drain-side channel layer D_CH.

The string conductive patterns CP1 to CPn may be arranged on n layers separated from each other below the bit line BL and the source line SL. The string conductive patterns CP1 to CPn may include source side conductive patterns CP_S and drain-side conductive patterns CP_D.

The source side conductive patterns CP_S may surround the source side channel layer S_CH and be stacked on top of each other and spaced apart from each other. The source side conductive patterns CP_S may include source side word lines WL_S and a source selection line SSL. The source selection line SSL may be arranged over the source side word lines WL_S. The source selection line SSL may be arranged in a single layer or at least two layers over the source side word lines WL_S. FIG. 4 illustrates that the source selection line SSL includes an nth string conductive pattern CPn, which is the uppermost layer of the source side conductive patterns CP_S, and an (n−1)th string conductive pattern CPn−1 formed thereunder. However, the invention is not limited thereto, and the layers forming the source selection line SSL may vary depending on each memory device.

The drain-side conductive patterns CP_D may surround the drain-side channel layer D_CH and be stacked on top of each other and spaced apart from each other. The drain-side conductive patterns CP_D may include drain-side word lines WL_D and a drain selection line DSL. The drain selection line DSL may be arranged over the drain-side word lines WL_D. The drain selection line DSL may be arranged in a single layer or at least two layers over the drain-side word lines WL_D. In FIG. 4, the drain selection line DSL includes an nth string conductive pattern CPn, which is the uppermost layer of the drain-side conductive patterns CP_D, and an (n−1)th string conductive pattern CPn−1 formed thereunder. However, the invention is not limited thereto, and the layers forming the drain selection line DSL may vary depending on each memory device.

The source side conductive patterns CP_S and the drain-side conductive patterns CP_D may be separated from each other with a slit SI interposed therebetween. The source side conductive patterns CP_S and the drain-side conductive patterns CP_D may be stacked in a III direction, and extend in the I direction.

The pipe gate PG may be located below the source side conductive patterns CP_S and the drain-side conductive patterns CP_D and surround the pipe channel layer P_CH. The pipe gate PG may be located below the string conductive patterns CP1 to CPn and defined as a lower conductive pattern LCP involved in operations of the string USCT.

An outer wall of the channel layer CH may be surrounded by a multilayer film ML including a tunnel insulating layer, a data storage layer and a blocking insulating layer. The tunnel insulating layer may surround the outer wall of the channel layer CH and be formed in the shape of the outer wall of the channel layer CH. The data storage layer may surround an outer wall of the tunnel insulating layer and be formed in the shape of the outer wall of the tunnel insulating layer. The blocking insulating layer may surround an outer wall of the data storage layer and be formed in the shape of the data storage layer. Though not shown in FIG. 4, the multilayer film ML may be formed along sidewalls of each of the string conductive patterns CP1 to CPn contacting the channel layer CH and extend along upper and lower surfaces of each of the string conductive patterns CP1 to CPn. The multilayer film ML may be separated by the slit SI into a C-shaped cross section.

Accordingly, source side memory cells may be formed at intersections between the source side channel layer S_CH and the source side word lines WL_S, and drain-side memory cells may be formed at intersections between the drain-side channel layer D_CH and the drain-side word lines WL_D. A source selection transistor may be formed at an intersection between the source side channel layer S_CH and the source selection line SSL. A drain selection transistor may be formed at an intersection between the drain-side channel layer D_CH and the drain selection line DSL. A pipe transistor may be formed at an intersection between the pipe channel layer P_CH and the pipe gate PG. The source selection transistor, the source side memory cells, the pipe transistor, the drain-side memory cells, and the drain selection transistor arranged along the channel layer CH may be coupled in series through the channel layer CH. The source selection transistor, the source side memory cells, the pipe transistor, the drain-side memory cells, and the drain selection transistor may be defined as the U type string UCST according to the U shape of the channel layer CH. The source side word lines WL_S may transfer signals to gates of the source side memory cells, the drain-side word lines WL_D may transfer signals to gates of the drain-side memory cells, the source selection line SSL may transfer a signal to a gate of the source selection transistor, the drain selection line DSL may transfer a signal to a gate of the drain selection transistor, and the pipe gate PG may transfer a signal to the pipe gate PG of the pipe transistor. The pipe transistor may couple the source side memory cells and the drain-side memory cells to each other in response to the signal applied to the pipe gate PG.

The channel layer CH may have various shapes, such as a W type, including the above-described U type. The memory cells may be arranged in various manners depending on the structure of the channel layer CH, so that the string structure may be formed into various shapes.

Referring to FIG. 5, the lower conductive pattern LCP may include the source line SL contacting a bottom surface of the channel layer CH. The source line SL may be a doped polysilicon layer. The channel layer CH may contact a top surface of the source line SL and extend to the bit line BL in the III direction.

A sidewall of the channel layer CH shown in FIG. 5 may be surrounded by the multilayer film ML including a tunnel insulating layer, a data storage layer and a blocking insulating layer. The tunnel insulating layer may surround the channel layer CH and be formed along the sidewall of the channel layer CH. The data storage layer may surround the tunnel insulating layer and be formed along a sidewall of the tunnel insulating layer. The blocking insulating layer may surround the data storage layer and be formed on the sidewall of the data storage layer. Though not shown in FIG. 5, the multilayer film ML may be formed on sidewalls of each of the memory string conductive patterns CP contacting the channel layer CH and extend along top and bottom surfaces of each of the memory string conductive patterns CP. The multilayer film ML may be separated by slits SI and USI into a C-shaped cross section.

Figure 6:
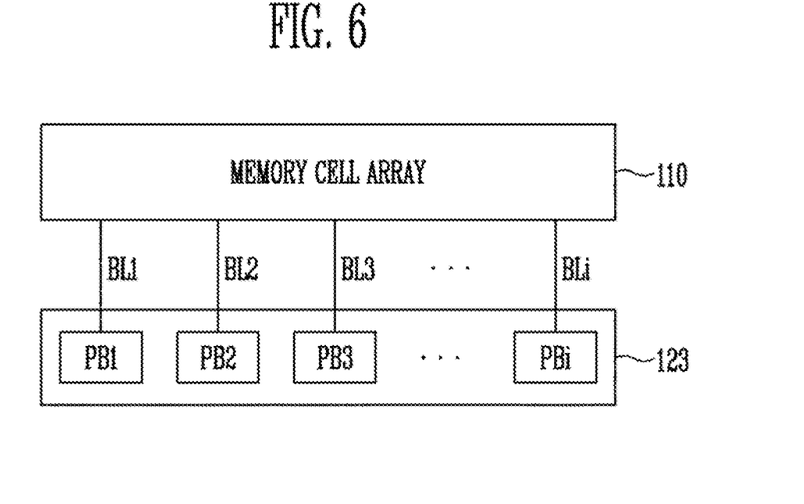
FIG. 6 is a block diagram illustrating a connection between a memory cell array and a page buffer group shown in FIG. 3.

FIG. 6 is a block diagram illustrating a connection between the memory cell array 110 and the page buffer group 123 shown in FIG. 3.

Referring to FIG. 6, the page buffer group 123 may include a plurality of page buffers PB1 to PBi, where i is a positive integer. The page buffers PB1 to PBi may be coupled to the memory cell array 110 through bit lines BL1 to BLi, respectively. During a read operation, the page buffers PB1 to PBi may sense data stored in memory cells of a selected page through the bit lines BL1 to BLi, respectively.

Since the page buffers PB1 to PBi are similarly configured, one of the page buffers, for example, the page buffer PB1 is described below.

Figure 7:
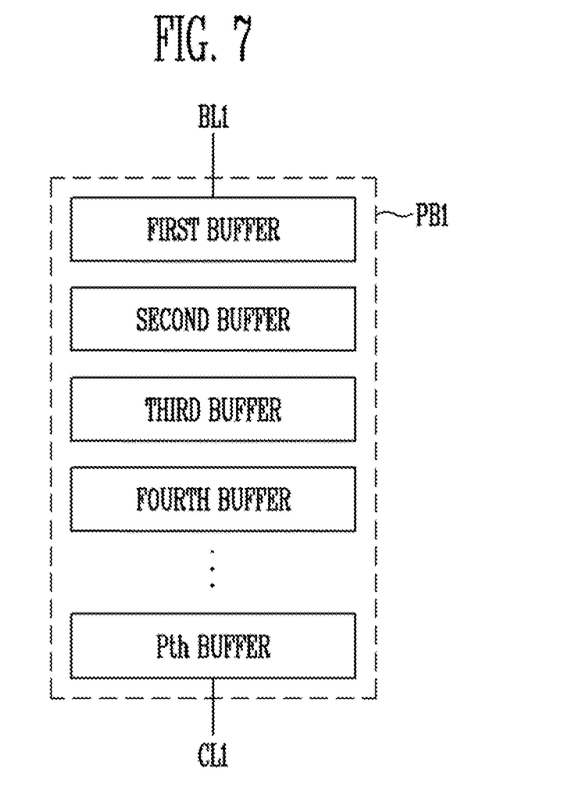
FIG. 7 is a block diagram illustrating a page buffer shown in FIG. 6.

FIG. 7 is a block diagram illustrating the page buffer PB1 shown in FIG. 6.

Referring to FIG. 7, the page buffer PB1 may include a plurality of buffers that sense data through the bit line BL1, temporarily store the sensed data, and output the sensed data or the temporarily stored data. For example, the page buffer PB1 may include first to Pth buffers, where P is a positive integer.

The first to Pth buffers may be embodied as latches. Some of the first to Pth buffers may serve as a main buffer storing sensed data of a selected page, a temporary buffer temporarily storing high usage frequency data, and an output buffer outputting data transferred from the main buffer or the temporary buffer to an external device, that is, the column decoder (124 of FIG. 3) through a corresponding column line CL1. The temporary buffer may serve as a cache buffer.

Figure 8:
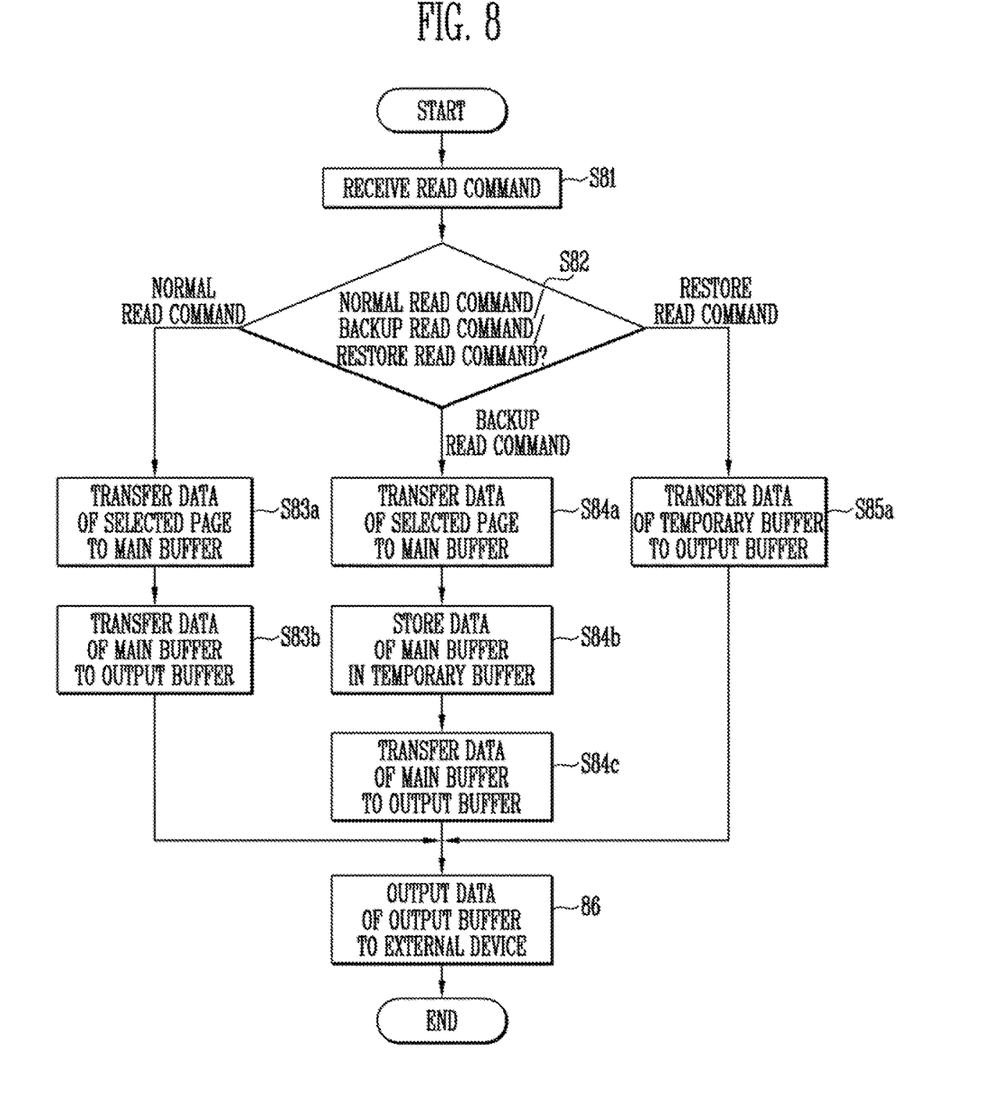
FIG. 8 is a flowchart illustrating an operating method for a memory device according to an embodiment of the present invention.

FIG. 8 is a flowchart illustrating an operating method for a memory device according to an embodiment of the present invention.

Referring to FIG. 8, when a read operation starts, the memory device MD11 shown in FIG. 3 may receive a read command (S81). The memory device MD11 may determine a type of the received read command and perform a read operation in response to the determined read command.

More specifically, the control circuit 130 of the memory device MD11 may determine whether the received read command is a normal read command, a backup read command, or a restore read command (S82). The control circuit 130 may control the peripheral circuit 120 as shown in FIG. 3 to perform a normal read operation when it is determined that the received read command is a normal read command. The control circuit 130 may control the peripheral circuit 120 to perform a backup read operation when it is determined that the received read command is a backup read command. The control circuit 130 may control the peripheral circuit 120 to perform a restore read operation when it is determined that the received read command is a restore read command.

When the memory device receives the normal read command, data stored in a selected page of a selected memory block may be transferred to the main buffer of the page buffers (S83a). That is, the main buffer may sense the data of the selected page. When the sensing operation of the main buffer is completed, the data of the main buffer may be transferred to the output buffer (S83b), and the data transferred to the output buffer may be output to an external device (S86). During the normal read operation, the data of the selected page may be output through the main buffer and the output buffer. The main buffer may be initialized after transferring the data of the main buffer to the output buffer, and the output buffer may be initialized after outputting the data of the output buffer to the external device. Since the main buffer and the output buffer are initialized for subsequent operations, the data temporarily stored in the main buffer to perform the sensing operation and the data temporarily stored in the output buffer to perform the output operation may be lost.

When the memory device receives the backup read command, the data stored in the selected page of the selected memory block may be transferred to the main buffer of the page buffers (S84a). When the memory device receives the backup read command, the main buffer may sense the data of the selected page, that is, a sensing operation may be performed by the main buffer. The backup read command may be a command for temporarily storing high usage frequency data in the page buffer and outputting the high usage frequency data to an external device. The high usage frequency data may be designated by a user or determined by the memory controller. For example, when the user designates specific data as frequently read data and inputs a corresponding command through a host, the memory controller may transfer a backup read command to the memory device in response to the input command. When the memory controller determines the high usage frequency data, the memory controller may count read operations of each page, store an address of a page in which the number of the read operations exceeds a reference number, and generate a backup read command to perform a read operation on a page corresponding to the stored address when a read command for the corresponding page is received from the host. The page read by the backup read command may be read in response to a restore read command during a subsequent read operation.

When the sensing operation of the main buffer is completed, the data of the main buffer may be transferred to the temporary buffer (S84b). The temporary buffer may temporarily store the stored data until the temporary buffer is initialized by an initialization command. For example, the temporary buffer may maintain the stored data without being initialized immediately after the data stored in the temporary buffer is transferred to the output buffer. After the high usage frequency data is stored in the temporary buffer, the data stored in the main buffer may be transferred to the output buffer (S84c), and the data transferred to the output buffer may be output to the external device (S86).

As described above, since the data of the selected page is the high usage frequency data during the backup read operation, the data may be temporarily stored in the temporary buffer and the data may be output through the output buffer. Although the main buffer and the output buffer are initialized for subsequent operations, the temporary buffer may not be initialized until an initialization operation is performed in response to the initialization command. Therefore, the data stored in the temporary buffer may be maintained even when the read operation is terminated.

When the memory device receives the restore read command, the data stored in the temporary buffer may be transferred to the output buffer (S85a). That is, since sensing the data of the selected page is skipped and the data stored in the temporary buffer is directly transferred to the output buffer, the entire operation time may be reduced by the skipped sensing operation time. The data transferred to the output buffer may be output to an external device (S86). Since the data of the selected page is output through the temporary buffer and the output buffer without performing a sensing operation during the restore read operation, a read operation time for the high usage frequency data may be reduced. The temporary buffer storing the high usage frequency data is not initialized after the restore read operation is performed, the high usage frequency data may be retained.

The above-described read operations are described below in more detail.

Figure 9:
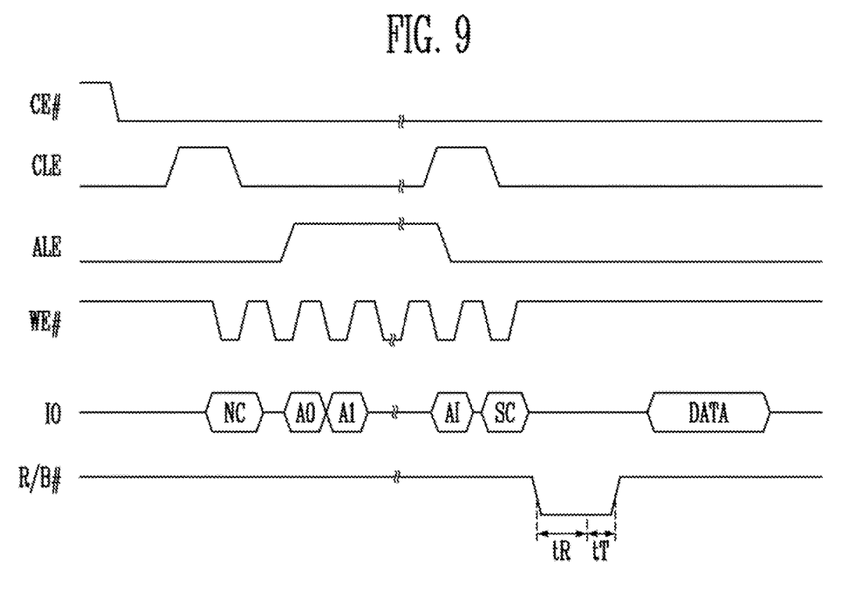
FIG. 9 is a timing diagram illustrating a normal read operation of a memory device according to an embodiment of the present invention.
Figure 10:
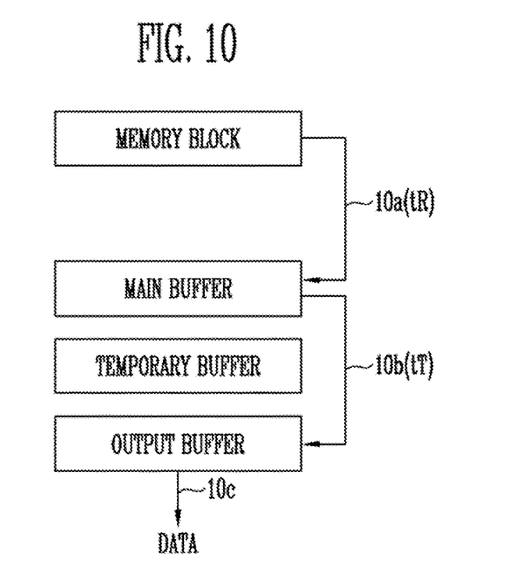
FIG. 10 is a diagram illustrating movements of data during the normal read operation of FIG. 9.

FIG. 9 is a timing diagram illustrating a normal read operation of a memory device according to an embodiment of the present invention. FIG. 10 is a diagram illustrating data movement during the normal read operation shown in FIG. 9.

Referring to FIG. 9, the memory device may be selected so that a read operation may be performed thereon in response to the chip enable signal CE#. For example, the chip enable signal CE# having a low level may be transferred to the selected memory device and chip enable signals CE# having a high level may be transferred to unselected memory devices. When the command latch enable signal CLE activated to a high level is input through a channel, the selected memory device may be ready to receive a command. When a normal read command NC is loaded on the input/output lines IO and the write enable signal WE# is toggled, the normal read command NC loaded on the input/output lines IO may be input to the selected memory device. In response to the normal read command NC, the memory device may be set to a normal read operation mode.

After the command latch enable signal CLE is deactivated to a low level, when the address latch enable signal ALE activated to a high level is input through the channel, the memory device may be ready to receive an address. Addresses A0 to AI corresponding to a page on which a read operation is performed may be sequentially loaded on the input/output lines IO, where I is a positive integer. The addresses A0 to AI may be sequentially input to the memory device each time the write enable signal WE# is toggled.

To perform a sensing operation, the command latch enable signal CLE may be activated to a high level and the address latch enable signal ALE may be deactivated to a low level. With the command latch enable signal CLE activated to the high level, when a sensing command SC is loaded on the input/output lines IO and the write enable signal WE# is toggled, the sensing command SC loaded on the input/output lines IO may be input to the memory device.

In response to the normal read command NC, the addresses A0 to AI and the sensing command SC, the memory device may sense data of a selected page by the main buffer during a sensing time tR and transfer data from the main buffer to the output buffer during a transfer time tT. While performing a sensing operation and a data transfer operation, the memory device may output the ready/busy signal R/B# at a low level to inform the memory controller that the memory device is in a busy state. The data DATA transferred to the output buffer may be output to the memory controller through the input/output lines IO.

As described above, a busy period of the normal read operation, that is, a period when the ready/busy signal R/B# is at a low level, may be performed during a sum of the sensing time tR and the transfer time tT.

Referring to FIG. 10, the data from the selected page of the memory block may be sensed and stored in the main buffer during the sensing time tR (10a), and the data of the main buffer may be transferred to the output buffer during the transfer time tT (10b). The data transferred to the output buffer may be output to the external device (10c).

Figure 11:
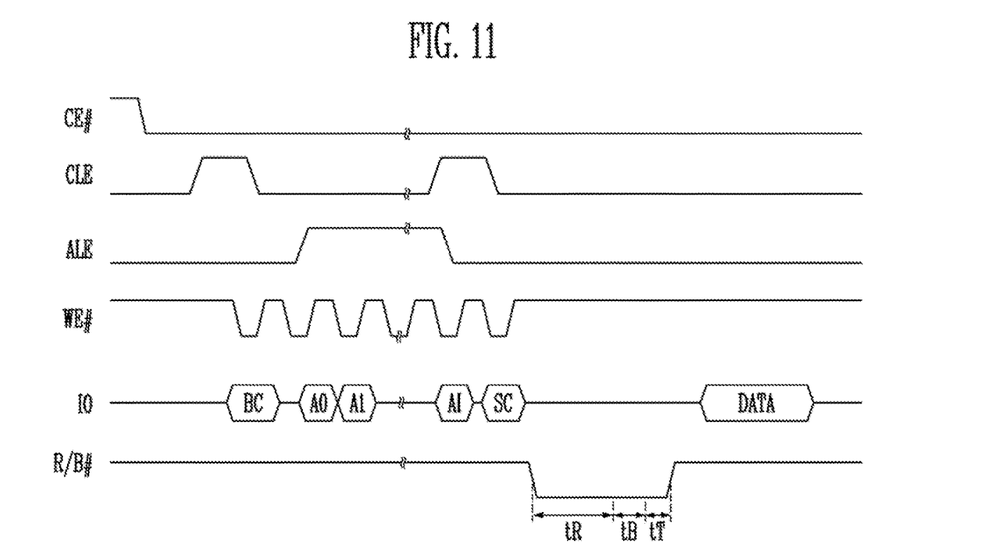
FIG. 11 is a timing diagram illustrating a backup read operation of a memory device according to an embodiment of the present invention.
Figure 12:
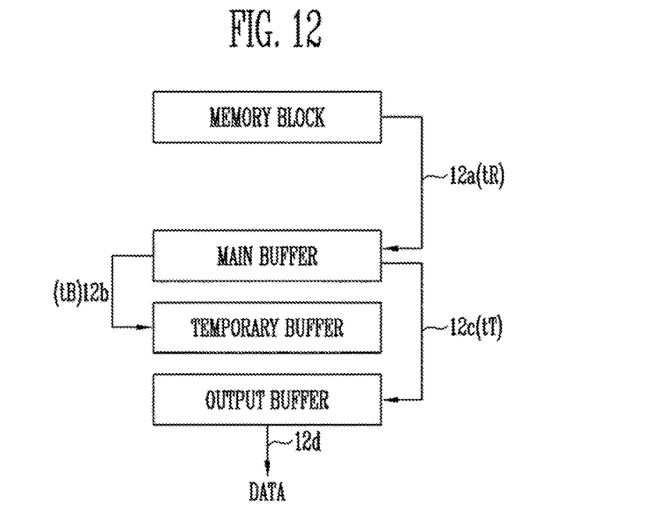
FIG. 12 is a diagram illustrating movements of data during the backup read operation of FIG. 11.

FIG. 11 is a timing diagram illustrating a backup read operation of a memory device according to an embodiment of the present invention. FIG. 12 is a diagram illustrating data movement during the backup read operation shown in FIG. 11.

Referring to FIG. 11, the memory device on which a read operation is performed may be selected in response to the chip enable signal CE#. For example, when the chip enable signal CE# having a low level is transferred to the selected memory device, the chip enable signals CE# having a high level may be transferred to unselected memory devices. When the command latch enable signal CLE activated to a high level is input through a channel, the selected memory device may be ready to receive a command. When a backup read command BC is loaded on the input/output lines IO and the write enable signal WE# is toggled, the backup read command BC loaded on the input/output lines IO may be input to the selected memory device. The memory device may be set to a backup read operation mode in response to the backup read command BC.

After the command latch enable signal CLE is deactivated to a low level, when the address latch enable signal ALE activated to a high level is input through a channel, the memory device may be ready to receive an address. The address A0 to AI corresponding to a page on which a read operation is performed may be sequentially loaded on the input/output lines IO, where I is a positive integer. The addresses A0 to AI may be sequentially input to the memory device each time the write enable signal WE# is toggled.

To perform a sensing operation, the command latch enable signal CLE may be activated to a high level and the address latch enable signal ALE may be deactivated to a low level. With the command latch enable signal CLE activated to the high level, when the sensing command SC is loaded on the input/output lines IO and the write enable signal WE# is toggled, the sensing command SC loaded on the input/output lines IO may be input to the memory device.

The memory device may sense data of a selected page by the main buffer during the sensing time tR in response to the backup read command BC, the addresses A0 to AI and the sensing command SC. When the sensed data is stored in the main buffer, data in the main buffer may be backed up to the temporary buffer during a backup time tB. Subsequently, data may be transferred from the main buffer to the output buffer during the transfer time tT. The memory device may output the ready/busy signal R/B# at a low level during sensing, backup and data transfer operations to inform the memory controller that the memory device is in a busy state. The data DATA transferred to the output buffer may be output to the memory controller through the input/output lines IO.

As described above, a busy period of the backup read operation, that is, a period during which the ready/busy signal R/B# is at a low level, may be performed during a sum of the sensing time tR, the backup time tB and the transfer time tT.

Referring to FIG. 11, data may be sensed from the selected page of the memory block and stored in the main buffer during the sensing time tR (12a), the data of the main buffer may be backed up to the temporary buffer during the backup time tB (12b), and the data of the main buffer may be transferred to the output buffer during the transfer time tT (12c). The data transferred to the output buffer may be output to the external device (12d).

Figure 13:
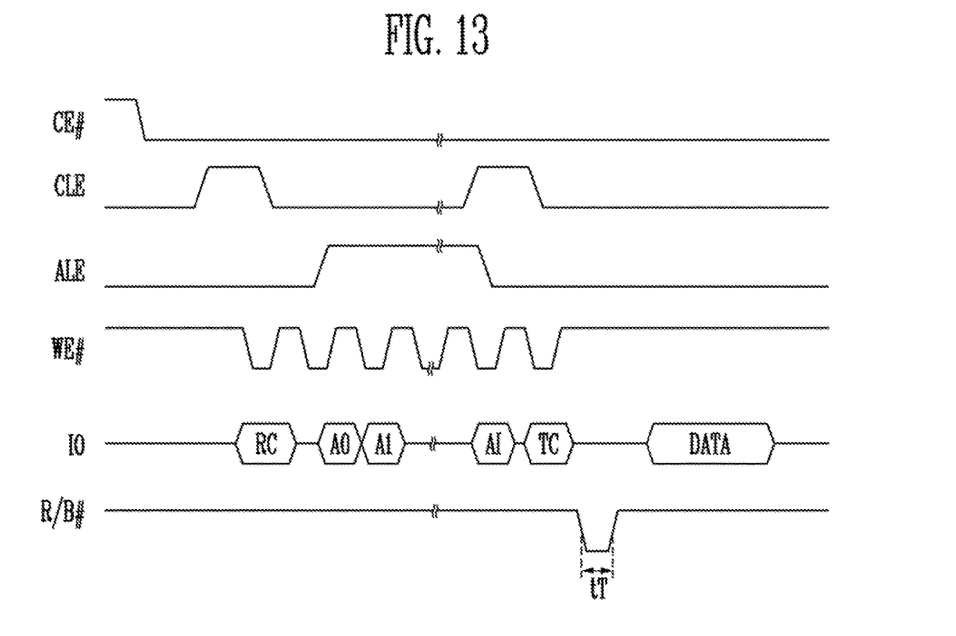
FIG. 13 is a timing diagram illustrating a restore read operation of a memory device according to an embodiment of the present invention.
Figure 14:
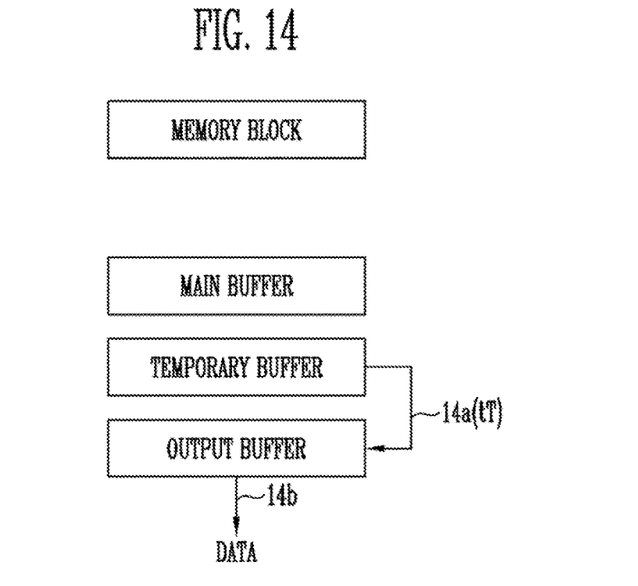
FIG. 14 is a diagram illustrating movements of data during the restore read operation of FIG. 13.

FIG. 13 is a timing diagram illustrating a restore read operation of a memory device according to an embodiment of the present invention. FIG. 14 is a diagram illustrating data movement during the restore read operation shown in FIG. 13.

Referring to FIG. 13, the memory device on which a read operation is performed may be selected in response to the chip enable signal CE#. For example, the chip enable signal CE# having a low level may be transferred to a selected memory device, and the chip enable signals CE# having a high level may be transferred to unselected memory devices. When the command latch enable signal CLE activated to a high level is input through a channel, the selected memory device may be ready to receive a command. When a restore read command RC is loaded on the input/output lines IO and the write enable signal WE# is toggled, the restore read command RC loaded on the input/output lines IO may be input to the selected memory device. Since the memory device has received the restore read command RC, the memory device may be set to a restore read operation mode.

After the command latch enable signal CLE is deactivated to a low level, when the address latch enable signal ALE activated to a high level is input through a channel, the memory device may be ready to receive an address. The addresses A0 to AI corresponding to a page on which a read operation is performed may be sequentially loaded on the input/output lines IO, where I is a positive integer. The addresses A0 to AI may be sequentially input to the memory device each time the write enable signal WE# is toggled. The addresses A0 to AI may include addresses of temporary buffers of page buffers.

To perform a data transfer operation without a sensing operation, the command latch enable signal CLE may be activated to a high level and the address latch enable signal ALE may be deactivated to a low level. With the command latch enable signal CLE activated to the high level, when a transfer command TC is loaded on the input/output lines IO and the write enable signal WE# is toggled, the transfer command TC loaded on the input/output lines IO may be input the memory device. That is, since the selected page is not sensed during the restore read operation, the sensing command SC as shown in FIGS. 9 and 11 may not be input and the transfer command TC only for data transfer may be input.

The memory device may transfer the data stored in the temporary buffer to the output buffer during the transfer time tT in response to the restore read command RC, the addresses A0 to AI and the transfer command TC. The memory device may output the ready/busy signal R/B# at a low level during the data transfer operation to inform the memory controller that the memory device is in a busy state. The data DATA transferred to the output buffer may be output to the memory controller through the input/output lines IO.

As described above, a busy period of the restore read operation, that is, a period during which the ready/busy signal R/B# is at a low level, may be performed during the transfer time tT.

Referring to FIG. 14, the data of the main buffer may be transferred to the output buffer during the transfer time tT (14a). The data transferred to the output buffer may be output to the external device (14b). Furthermore, the restore read operation may be performed during the transfer time tT without the sensing time tR, so that a read operation time may be reduced.

Figure 15:
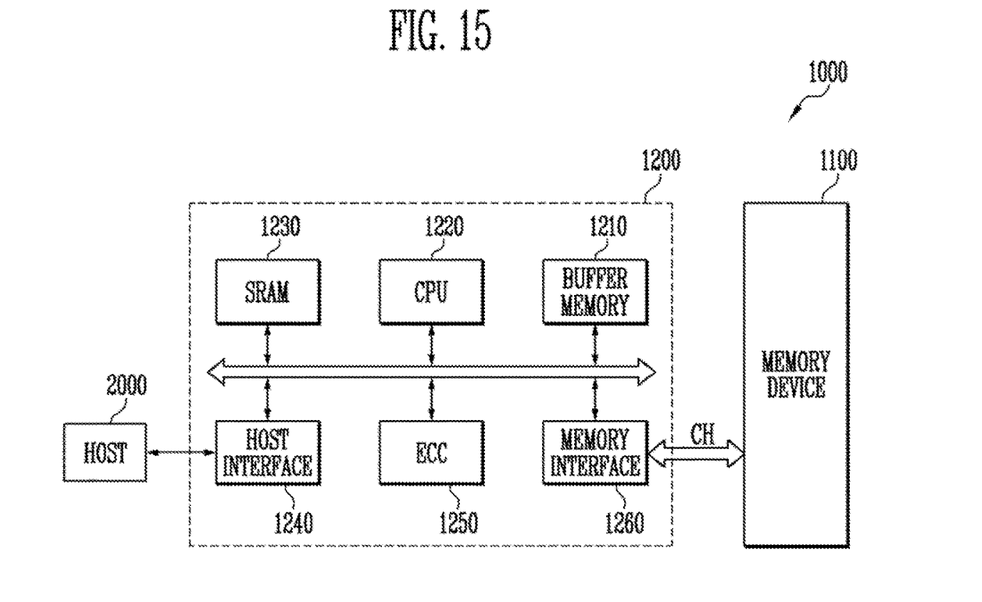
FIG. 15 is a detailed block diagram of a memory controller according to an embodiment of the present invention.

FIG. 15 is a detailed block diagram illustrating a memory system 1000 according to an embodiment of the present invention.

Referring to FIG. 15, the memory system 1000 may include a memory device 1100 storing data therein and a memory controller 1200 controlling the memory device 1100. The memory device 1100 and the memory controller 1200 of FIG. 15 may have substantially the same structures as the memory group 1100 and the memory controller 1200 of the memory system shown in FIG. 1. In addition, the memory controller 1200 may control communication between the host 2000 and the memory device 1000. The memory controller 1200 may include the buffer memory 1210, a central processing unit (CPU) 1220, a static random access memory (SRAM) 1230, a host interface 1240, an error correction code (ECC) 1250 and a memory interface 1260.

The buffer memory 1210 may store various types of information necessary to perform operations of the memory controller 1200. The CPU 1220 may perform various operations to control the memory device, or generate commands and addresses. For example, the CPU 1220 may generate a normal read command NC, a backup read command BC, and a restore read command RC. In addition, the CPU 1220 may determine states of memory devices in response to a read/busy signal R/B# received through input/output lines IO, determine the order in which selected memory devices are operated according to a result of determination, or generate commands to control operations of a selected memory chip. The SRAM 1230 may be used as a working memory. The host interface 1240 may include a data exchange protocol of the host 2000 being coupled to the memory system 1000. The ECC 1250 may be an error correction unit that detects and corrects errors included in data read from the memory device 1100. The memory interface 1260 may be coupled to the memory device 1000 through a channel CH and interface with the memory device 1110.

Figure 16:
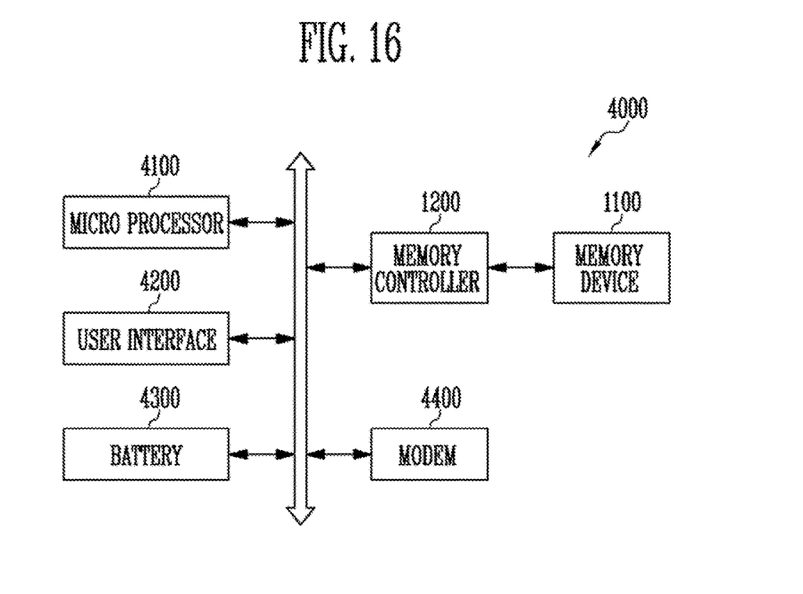
FIG. 16 is a schematic block diagram of a computing system including a memory system according to an embodiment of the present invention.

FIG. 16 is a schematic block diagram of a computing system including a memory system 4000 according to an embodiment of the present invention.

Referring to FIG. 16, the memory system 4000 according to an embodiment may include a memory device 1110, a memory controller 1200, a microprocessor 4100, a user interface 4200 and a modem 4400. The memory device 1100 and the memory controller 1200 of FIG. 16 may have substantially the same structures as the memory group 1100 and the memory controller 1200 of the memory system shown in FIG. 1. In addition, when the memory system 4000 according to an embodiment is a mobile device, a battery 4300 may be additionally included to supply an operating voltage of the memory system 4000. Though not shown in FIG. 16, the memory system 4000 according to an embodiment may further include an application chip set, a camera image processor (CIS), a mobile Dram (not shown), and the like.

The memory system 4000 according to an embodiment may be mounted using various types of packages. For example, the memory system 4000 according to an embodiment may be mounted using packages such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi chip package (MCP), wafer-level fabricated package (WFP), wafer-level processed stack package (WSP), and the like.

According to an embodiment, a read operation time of a memory device may be reduced, and the workload of a memory controller controlling the memory device may be reduced, so that performance of a memory system may be improved.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A memory device comprising:
    a memory block including a plurality of pages;
    a peripheral circuit including a plurality of page buffers having a main buffer and a temporary buffer, respectively; and
    a control circuit configured to control the peripheral circuit, in response to a backup read command, to sense high usage frequency directly from the memory block to store to the main buffer, to output the high usage frequency data directly from the main buffer to a host device, and to temporarily store the high usage frequency data transferred from the main buffer to the temporary buffer, wherein the main buffer is initialized after outputting the high usage frequency data to the host device and the temporary buffer retains the high usage frequency data after the main buffer is initialized.

2. The memory device of claim 1, wherein the main buffer is coupled to the memory block through a bit line and stores the high usage frequency data sensed through the bit line, the temporary buffer is coupled to the main buffer, and an output buffer is coupled to the main buffer and the temporary buffer,
    wherein the output buffer outputs the high usage frequency data transferred from the main buffer.

3. The memory device of claim 1, wherein the temporary buffer maintains the high usage frequency data until the temporary buffer is initialized by an initialization command.

4. The memory device of claim 2, wherein the output buffer is initialized after outputting the high usage frequency data to the external device.

5. The memory device of claim 1, wherein the control circuit is configured to control the peripheral circuit, in response to a normal read command, to sense data from the memory block using the main buffer, and to output the data from the main buffer.

6. The memory device of claim 1, wherein the control circuit is configured to control the peripheral circuit, in response to a restore command, to output the high usage frequency data stored in the temporary buffer.

7. A memory system comprising;
    a memory configured to designate high usage frequency data based on the number of read operations, and to provide a backup read command; and
    a memory device comprising:
    a memory block including a plurality of pages;
    a peripheral circuit including a plurality of page buffers having a main buffer and a temporary buffer, respectively; and
    a control circuit configured to control the peripheral circuit, in response to a backup read command, to sense high usage frequency directly from the memory block to store to the main buffer, to output the high usage frequency data directly from the main buffer to a host device, and to temporarily store the high usage frequency data transferred from the main buffer to the temporary buffer, wherein the main buffer is initialized after outputting the high usage frequency data to the host device and the temporary buffer retains the high usage frequency data after the main buffer is initialized.

8. The memory system of claim 7, wherein, when the high usage frequency data is designated by the memory controller, the memory controller counts read operations of each of pages included in the memory block of the memory device, stores an address of a page in which the number of read operations exceeds a reference number, and generates the backup read command to perform a read operation on the page corresponding to the stored address when receiving a read command for the page from a host.

9. The memory system of claim 8, wherein the memory controller provides a restore read command during a subsequent read operation on the page on which the read operations are performed in response to the backup read command.

10. The memory system of claim 7,
    wherein the main buffer is coupled to the memory block through a bit line and stores the high usage frequency data sensed through the bit line,
    the temporary buffer temporarily stores the high usage frequency data transferred from the main buffer, and
    an output buffer is coupled to the main buffer and the temporary buffer, and
    wherein the output buffer outputs the high usage frequency data transferred from the main buffer.

11. The memory system of claim 7, wherein the temporary buffer maintains the high usage frequency data until the temporary buffer is initialized by an initialization command.

12. The memory system of claim 10, wherein the output buffer is initialized after outputting the high usage frequency data.

* * * * *